Oct. 29, 1940.  V. A. HOOVER  2,219,318
MOTOR CONSTRUCTION
Filed March 24, 1939  2 Sheets-Sheet 1

Vaino A. Hoover
INVENTOR

BY John D. Chesnut
ATTORNEY

Oct. 29, 1940.  V. A. HOOVER  2,219,318
MOTOR CONSTRUCTION
Filed March 24, 1939  2 Sheets-Sheet 2
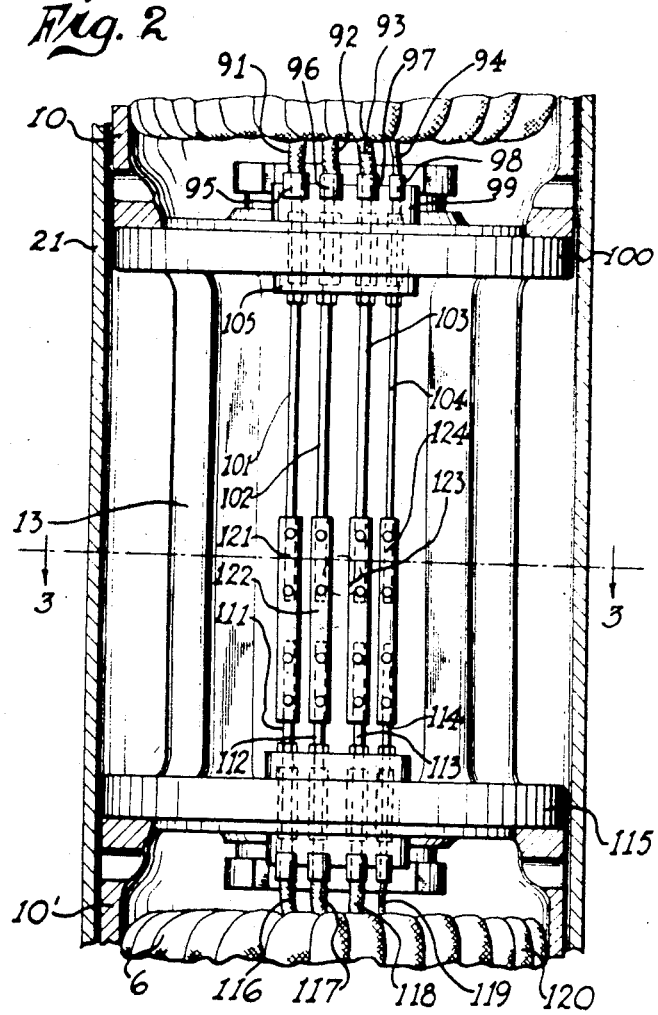
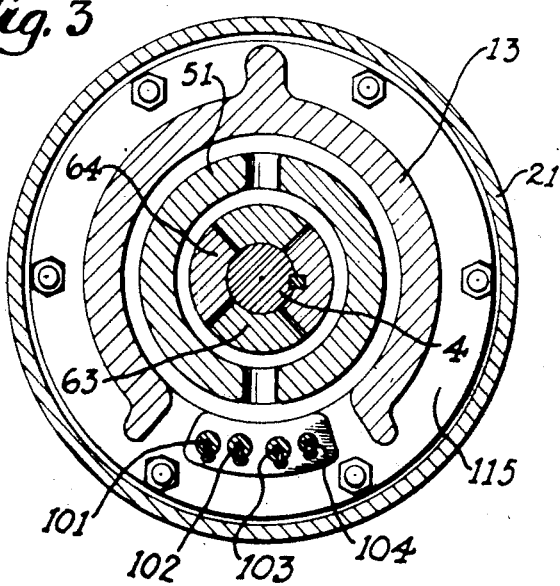
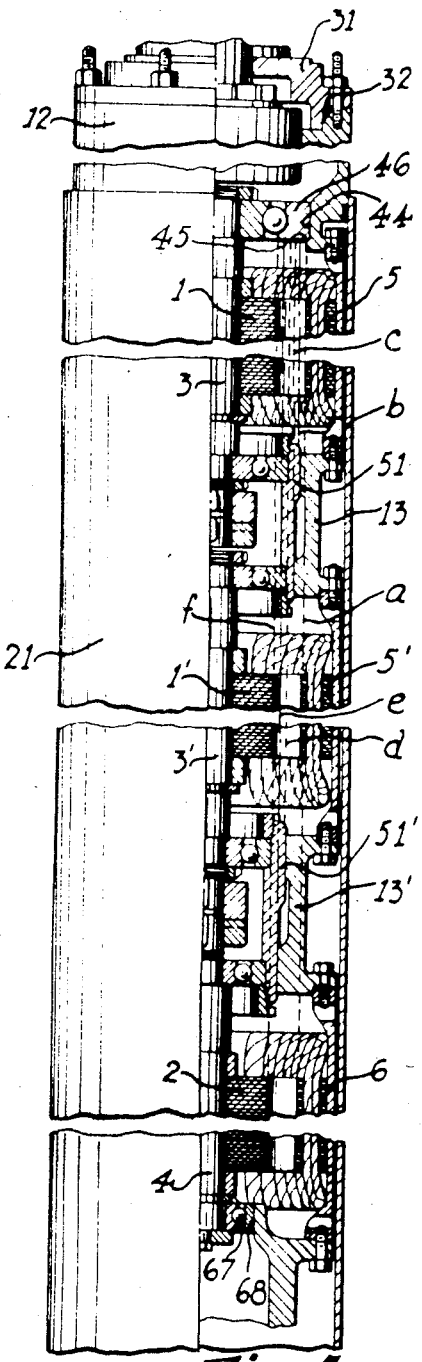
Vaino A. Hoover
INVENTOR.
BY John D. Chesnut
ATTORNEYS.

Patented Oct. 29, 1940

2,219,318

UNITED STATES PATENT OFFICE 2,219,318

MOTOR CONSTRUCTION

Vaino A. Hoover, Los Angeles, Calif., assignor to Byron Jackson Co., Huntington Park, Calif., a corporation of Delaware Application March 24, 1939, Serial No. 263,929

14 Claims. (Cl. 172—36)

This invention relates generally to electric motors, and pertains particularly to an improved submersible multiple-motor unit particularly adapted to operate a well pump.

Submersible motor-pump units for pumping wells usually comprise a pump and a submersible electric motor directly connected thereto, the pump and motor being suspended from the lower end of a discharge column and immersed in the liquid being pumped. Obviously the diameter of the motor is limited by that of the well casing, and for wells of considerable depth and small diameter it is not always possible to provide a single motor of adequate horsepower capacity. It is, however, entirely feasible to build up a plurality of motors in stacked relation into a motor unit of high horsepower rating while keeping the over all diameter within the required limits.

A principal object of this invention is to provide a submersible multiple-motor unit utilizing stock parts of single motor units, and affording ease of assembly and removal of the rotating parts.

A further object is to provide a multiple-motor unit in which the stators may be assembled into a rigid unit and the rotors with their bearings may be separately assembled into a rigid unit insertible into the stator unit and located therein with the rotors properly positioned relative to their respective stators, and with the rotor bearings seated in their respective seats, by the simple act of inserting the rotor assembly axially into the stator assembly.

A still further object is to provide a submersible multiple-motor unit in which the stator and rotor elements are encased in a fluid-tight housing, and in which the rotors and their bearings are insertible and removable from the housing as a unit, and in which it is necessary to break only a single seal on the housing in order to remove the rotor unit for inspection.

A still further object is to provide a multiple motor unit of the aforementioned type which is particularly adapted to be connected directly to a driven element which imposes an axial thrust on the motor shaft, and in which the axial thrust is absorbed between the driven element and the first rotor of the assembly, whereby the individual rotor shafts and their bearings are relieved of such axial thrust.

The foregoing and other objects and advantages will be made apparent from the following specification, taken in conjunction with the accompanying drawings wherein:

Fig. 1 is a central longitudinal sectional view of the upper portion of a multiple-motor assembly constructed in accordance with this invention;

Fig. 1ª is lower continuation of Fig. 1;

Fig. 2 is an elevational view of a spacer member connecting adjacent stators, as viewed at right angles to the plane of Fig. 1;

Fig. 3 is a transverse section taken on line 3—3 of Fig. 2; and

Fig. 4 is a view, partly in elevation and partly in longitudinal section, with proportions distorted to illustrate the relative diameters of the parts.

Figure 1:
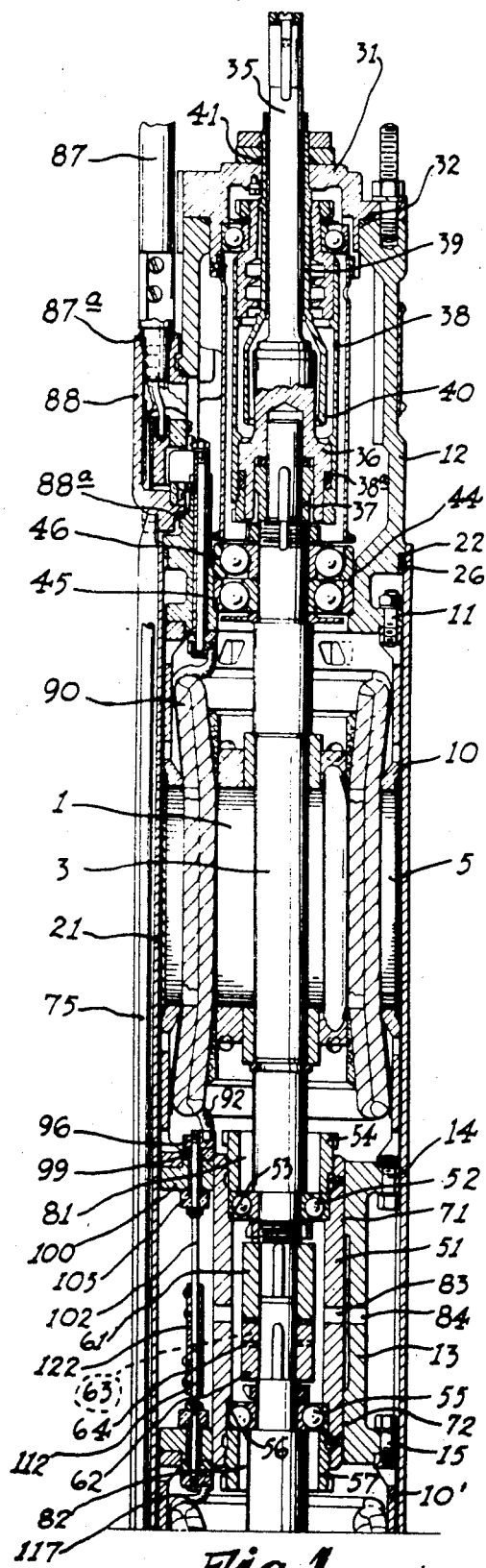

Referring to Figs. 1 and 2, the motor comprises generally a plurality of rotors 1 and 2 mounted respectively on rotor shafts 3 and 4 and rotatable within stators 5 and 6. The stators are built into stator shells 10, 10', the uppermost stator shell being bolted or otherwise rigidly secured as at 11 to the lower end of an upper bearing housing 12. The stator 10 and the bearing housing 12 have snugly fitting centering fits formed thereon for holding the two rigidly in coaxial relation. The adjacent ends of the stator shells are rigidly connected in coaxial spaced relation by a spacer member 13 connected at its opposite ends as by bolts 14 and 15 to the adjacent ends of the shells. While for purpose of illustration only two rotors and stators and one spacer member are shown in Figs. 1 and 2, it will be understood that as many stators may be included as is necessary to obtain the desired horsepower, a spacer member 13 being connected between adjacent ends of the stator shells.

An internally ribbed bearing housing 16 is secured to the lower flange of the lowermost stator shell, and has an internally threaded central hub into which is threaded an elongated bolt 17. An outer motor casing 21 encloses the entire motor assembly, fitting loosely over the stator shells and being secured in fluid-tight relation to the upper housing 12 by a sealing gasket 22. The bolt 17 extends through an opening in the lower end of the casing 21 and is threaded to receive a nut 23. A round gasket 24 confined within a recess in a gasket ring 25 effects a seal between the bolt and the casing. When the nut 23 is tightened the round gasket 24 is compressed and deformed into the triangular shape shown, and the gasket 22 at the upper end of the casing is also compressed between a gasket ring 26 and a shouldered recess in the housing 12. The motor assembly is thus wholly enclosed within a housing which is fluid tight except for the opening at the upper end of the upper housing 12 and a balance tube connected to the lower end of the motor casing 21 as explained hereinafter.

A flange 31 is bolted to the upper end of housing 12, and is sealed thereto by a round gasket 32 which is compressed into the triangular shape shown. The volume of gasket 32 is just sufficient to allow the flange 31 to make a metal-to-metal fit with the bearing housing 12. By means of this construction, the pump structure, which is mounted on flange 31, is held in rigid coaxial relation to the motor. Mounted within the housing 12 is a seal assembly, the details of which will not be described herein since they form a part of the subject matter of a copending application of Aladar Hollander and Vaino A. Hoover for Submersible motor assembly, Serial No. 178,741, filed December 8, 1937, now Patent No. 2,171,749, dated September 5, 1939. For the purpose of the present description, it will be sufficient to state that the seal assembly comprises generally a seal shaft 35 protruding through the flange 31 and having its outer end adapted to be connected in driving relation with a driven element such as a pump shaft. The lower end of the seal shaft is enlarged to form a coupling member 36 engageable with a complementary coupling member 37 keyed to the upper end of the uppermost rotor shaft 3. A seal housing member 38 is mounted on the enlarged lower end of the seal shaft 35 to rotate therewith, being journaled at its upper end in the flange 31. The seal housing 38 and the seal shaft 35 are held in fluid tight relationship by the gasket 38ª, to form an annular channel, which is filled with the sealing mercury. A stationary baffle 39 is secured to the flange 31 in spaced concentric relation to the seal shaft, and has a depending skirt portion 40 extending downwardly into the annular mercury channel formed between the shaft and the cup 38. The baffle 39 is sealed to flange 31 by the gasket 41. This seal has proven to be very effective in preventing admixture of the external liquid and the dielectric liquid which fills the motor casing.

The lower flange of the upper bearing housing 12 is formed with a bore 44 terminating in an upwardly facing shoulder 45 on which rests a combined radial and thrust bearing 46 designed to absorb the axial thrust of the superposed rotating parts and to center the upper end of shaft 3. The hereindescribed motor is particularly adapted for use with a multi-stage centrifugal pump, which exerts considerable hydraulic thrust downwardly, and the bearing 46 is designed to withstand this thrust, leaving the rotor shafts 3 and 4 free of all axial thrust.

The lower end of the uppermost rotor shaft and the upper end of the next subjacent rotor shaft are connected together in supporting relation and journaled in bearings mounted in a bearing cartridge 51. The outer race of an upper bearing 52 is confined between a shoulder 53 on the cartridge and a clamping nut 54. The outer race of a lower bearing 55 is similarly confined between a shoulder 56 and a clamping nut 57. The inner races of the bearings 52 and 55 are suitably clamped against shoulders on the rotor shaft by clamping nuts 58 and 59 respectively. The shafts are thus connected together in definitely spaced relation, such that the rotors are properly positioned with respect to their stators.

The adjacent ends of the rotor shafts 3 and 4 are connected together in driving relation by complementary coupling members 61 and 62 keyed to their respective shafts and provided with interengaging segmental jaws 63 and 64 respectively. In order to provide positive axial alignment of the ends of the shafts, one of the coupling members, herein the lower one 62, is made of less overall length than that of the shaft stub, whereby the latter projects into the cylindrical bore of the upper coupling member and the possibility of the shafts wobbling is entirely eliminated.

In addition to its function as a spacer for the stator shells, the spacer member 13 also serves as a centering means for the bearing cartridge 51. The outer wall of the latter is machined to a push fit in the bore of spacer member, and consequently when the motor is assembled the adjacent ends of the rotor shafts are rotatably supported by the spacer member. Preferably the upper and lower portions of the engaging surfaces on the cartridge and spacer member are stepped, the lower portions being reduced slightly so that the lower portion of the cartridge may pass freely through the bore of the upper portion of the spacer member. By this arrangement only the final few inches of assembling movement of the rotor assembly is a push fit, the enlarged upper portion of the cartridge moving into the corresponding enlarged upper bore of the spacer member at the same time that the reduced lower portion of the cartridge moves into the reduced lower bore of the spacer member. During this final movement the thrust bearing 46 moves into the bore 44 in the housing 12 with a push fit, and the radial bearing 67 on the lower end of the lowermost rotor shaft 4 moves into the bore 68 formed in the upper flange of the lower bearing housing 16.

An important feature of this invention, and one which makes possible the assembly of the motor in the manner described, is the relationship between the diameter of the lower bearing 67, the bore of the spacer member 13, the thrust bearing 46, and the bore of the opening in the upper end of the housing 12, with respect to the inner diameter of the stators and the rotor diameters. The stators are all identical, with equal internal diameters, and the rotors are likewise identical. The gap between the rotor and the stator is normally of the order of twenty thousandths of an inch in width, and this clearance is utilized to great advantage in this invention.

Inasmuch as the bearing cartridge 51 must pass through the upper stator 5, the cartridge must be of less diameter than the bore of the stator. Furthermore, the lower rotor 2 must pass through the spacer member 13, and consequently the bore of the spacer member must be larger than the rotor. However, the normal clearance between the rotors and their stators is of sufficient magnitude to permit several intermediate bores in stepped relation. A clearance of two thousandths of an inch on the diameter is sufficient to permit free axial movement, and consequently as many as twenty stepped bores in increments of two thousands of an inch may be provided between the rotor diameter and the stator bore. In the assembly illustrated, with two motor units and one spacer member, the diameter of the upper portion of cartridge 51 and of the upper bore of the spacer member 13, as indicated at 71, may be from two to seven thousandths less than that of the bore of the stator, providing ample clearance for the cartridge in passing through the upper stator. The lower diameter of the spacer member and of the cartridge, as indicated at 72, may be stepped down two to six thousandths less than that of the upper portion, and still leave a minimum of seven thousandths clearance between the lower rotor 2 and the spacer 13.

It will be understood that as many as ten stators and rotors and nine spacer members may be assembled in the manner described, while still retaining the stepped bores in the spacer member, and reducing the diameters in downward series in increments of two thousandths of an inch. By dispensing with the stepped bores in the spacer members, an even greater number of units may be assembled.

It will also be apparent that if more than two stators and rotors are assembled, the ends of the rotor shafts of the intermediate rotors will be identical with the lower end of upper rotor shaft 3 and the upper end of lower rotor shaft 4. Except for the outer ends of the two end sections of shaft, the rotors and stators are all identical, with identical diameters. The advantage of this feature from a manufacturing and assembling standpoint will be readily appreciated.

Figure 4 illustrates an assembly of at least three stators and rotors and at least two spacer members and bearing cartridges, the radial clearances being greatly exaggerated in order to clearly illustrate the stepped bores in the spacer members and the bearing cartridges intermediate the rotors and the stator bores. The dotted line $a$ represents the bore of the stators. The dot-and-dash line $b$ indicates the diameter of the upper portions of the upper spacer member 13 and bearing cartridge 51, slightly reduced relative to the stator bores to permit easy insertion of the cartridge through the upper stator. The dotted line $c$ indicates the diameter of the lower portions of the upper spacer member and cartridge, reduced relative to the upper portions to shorten the length of the push fit between the spacer member and cartridge. The dot-and-dash line $d$ indicates the diameter of the upper portions of the lower spacer member 13' and cartridge 51', this diameter being reduced relative to that of the lower portion of the upper spacer member to allow freedom of movement of the lower cartridge 51' though the upper spacer member. The dotted line $e$ indicates the diameter of the lower portions of the lower spacer member 13' and bearing cartridge 51', reduced relative to the upper portions thereof as in the upper spacer member and cartridge. The dotted line $f$ indicates the diameter of the rotors, which are all of uniform diameter. It will be observed from this figure that the rotors are of less diameter than the minimum diameter of any of the spacer members, to permit the lowermost rotor to pass freely through all of the spacer members.

It is to be understood that the clearance between the rotors and stators is only the normal clearance ordinarily provided, the clearance being greatly exaggerated in Fig. 4 for purpose of illustration.

By locating the thrust bearing 46 above the stators and rotors, a further advantage is derived in addition to relieving the rotor shafts of axial thrust. In order to absorb the thrust, this bearing is necessarily of relatively large diameter as compared to the motor shaft bearings 52 and 55. However, the only limitation on the size of this bearing is the size of the opening in the upper end of the housing 12, since this bearing does not pass through any of the stators. The lowermost radial bearing on the lower end of the lower rotor shaft 4 passes freely through the stators and spacer members, being of the same diameter as the bearings 52 and 55.

As stated previously, the motor housing is filled with a dielectric liquid, preferably oil, which is subjected to the pressure of the liquid in which the housing is submerged. A pressure balance is attained by means of a balance tube 75 open to the external liquid at its upper end and connected at 76 to the lower end of the motor casing 21. During operation of the motor the heat generated thereby is dissipated through the outer shell to the external liquid. Temperature differences in the oil cause thermo-siphonic circulation thereof, the oil adjacent the outer shell being cooled and descending between the outer casing 21 and the stator shells. This circulation of the oil also effectively lubricates the bearings, and in order to promote circulation through the bearing cartridges 51 the clamping nuts 54 and 57 are spaced from the shaft to provide annular channels 81 and 82 leading to the bearings 52 and 55. Radially extending ports 83 and 84 are also provided in the cartridges and in the spacer members 13 respectively to aid the circulation.

Figure 1A:
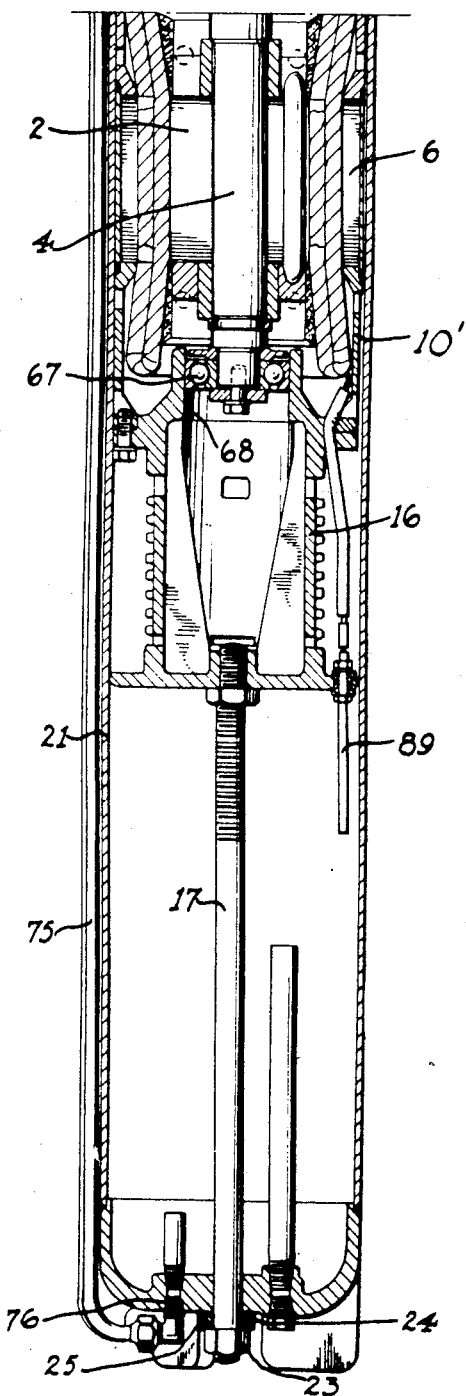

Electric current for energizing the motor units is conducted from the surface to the motor through an insulated, fluid tight cable 87 connected in fluid-tight relation to the upper housing 12 by a terminal box 88. The cable 87 is sealed to the terminal box 88 by a wiped metal joint 87a, and the terminal box in turn is sealed to the bearing housing 12 by the ring gasket 88a. The motor is preferably of the three-phase type, and the cable contains three power conductors and a control conductor leading to an oil level control terminal 89 (Fig. 1a). The function of the terminal 89 is to close an electrical circuit including an alarm or a motor de-energizing circuit at the surface in the event the level of the external liquid entering the casing 21 through the balance tube 75 should rise to contact the terminal. The manner in which the control circuit functions is described in detail in Patent No. 2,002,912, dated May 28, 1935, to Earl Mendenhall and Junius B. Van Horn. The manner in which the conductors in the cable are connected to the terminals of the windings 90 of the uppermost stator 5 is described in detail in the aforementioned application of Aladar Hollander and Vaino A. Hoover, and hence will not be repeated here. In the single-stator motor of that application the terminals of the stator windings all extend from the upper end of the stator. In the present instance, however, the respective phase-windings of all of the stators are connected in series, and for this purpose the terminals of each winding extend from opposite ends of the stators, the lower terminals of the windings of each stator being connected to the upper terminals of the windings of the next subjacent stator.

Figure 2 illustrates the manner in which the terminals of adjacent stators are connected. In this figure, the lower ends 91, 92, 93 of the windings 90 of the upper stator, and the control conductor 94, are soldered respectively into the terminal lugs 95, 96, 97, and 98 mounted on an insulating plate 99 secured to the upper flange 100 of the spacer member 13. Connector studs 101, 102, 103, and 104 are threadedly connected respectively to the terminal lugs 95, 96, 97, and 98 and extend through the flange 100, being insulated from the latter by insulating bushings. The insulating plate 99 has a plurality of equally spaced grooves formed therein, in which the terminal lugs 95, 96, 97, and 98 are held at the required spacing to line up with the connector studs 101, 102, 103, and 104. A second insulating plate 105 is secured to the under side of the flange 100, the terminal lugs and insulating plates being secured to the flange by nuts threaded on the connector studs and engaging the lower insulating plate.

As shown in Figs. 2 and 3, a portion of the wall of the spacer member 13 is cut away between the upper and lower flanges thereof, to provide space for the terminals. The latter extend downwardly and terminate in spaced relation to the upper ends of corresponding connector studs 111, 112, 113, and 114 extending upwardly from the lower flange 115 of the spacer member. The connection of the lower connector studs to the terminal lugs 116, 117, 118, and 119 of the windings 120 of the lower stator is identical with that just described, and need not be repeated. The corresponding upper and lower terminals are electrically connected by sleeves 121, 122, 123, and 124 secured thereto by set screws. It will be observed that the upper terminals 101, 102, 103, and 104 are of greater length than the lower ones, whereby the sleeves may be slid upwardly onto the upper terminals and temporarily held in raised position during assembly. By means of this construction the electrical connections can be made after the stators are rigidly secured together, thus obviating the difficulty of making both electrical and mechanical connections at the same time. As a result, the danger of injuring the electrical insulation is reduced to a minimum.

If more than two stators and rotors are used, it will be understood that the adjacent ends of the windings thereof will be connected in series in the manner just described. This arrangement greatly simplifies the assembly of a multiple stator unit, and permits the complete assembly of each stator independently. When the stator shells are bolted to the opposite ends of the spacer element the terminals of the windings are properly positioned with respect to each other, and the only step required to electrically connect the windings is to slide the sleeves 121, 122, 123, and 124 downwardly over the upper ends of the lower connector studs 111, 112, 113, and 114 and secure them by the set screws.

In order to emphasize the simplicity of the operation of assembling a multiple stator motor as described, the order of steps performed will be briefly summarized:

Assuming that the individual stators have been assembled, wound and baked, and that the individual rotors with their respective bearings have been assembled, and that the seal assembly is complete, the only steps required in assembling the stators is to bolt them to opposite ends of the spacer members. The uppermost stator should be provided with the extra long terminal extending upwardly to the terminal box 88, and the lower ends of the lowermost stator windings are interconnected to complete the circuit for the stator windings. Otherwise the stators are identical. The upper housing 12 is secured to the upper end of the upper stator shell, and the lower bearing housing 16 is secured to the lower end of the lowermost stator shell. The connector studs of the stator windings are inserted through the holes in the flanges of the spacer members as the latter are connected to the stator shells, and the connector studs and insulating plates are rigidly clamped to the flanges by the nuts threaded on the studs. When so clamped, the upper and lower sets of connector studs are in alignment, and the connecting sleeves may be slipped down over the lower studs and secured to both sets.

In assembling the rotors, the complementary coupling members 61 and 62 are keyed to adjacent ends of the shafts, and the latter are then inserted into opposite ends of a bearing cartridge 51. The jaws 63 and 64 on the coupling member interengage in driving relation, but prior to endwise abutment of the coupling members the bearings 52 and 55 seat on the shoulders 53 and 56 in the cartridge, thus leaving the rotor shafts floating freely on the bearings. The clamping nuts 54 and 57 are then threaded into the cartridge to hold the bearings on their seats.

The rotor assembly is inserted as a unit into the stator assembly through the opening in the end of the upper bearing housing 12. The lower rotor passes through the spacer member 13 with ample clearance, and the lower reduced portion of the bearing cartridge slides freely through the bore of the upper end of the spacer member, due to the stepped bores in the latter. The large combined thrust and radial bearing 46 at the upper end of the uppermost rotor shaft passes freely through the opening in the housing 12. All of the parts thus move freely into the stator assembly until just prior to reaching their final positions. During the final few inches of movement the bearing 46 is pushed into the bore 44, the upper and lower portions of the cartridge 51 are pushed respectively into the corresponding upper and lower bores in the spacer member 13, and the lowermost radial bearing 67 is pushed into the bore 68. The seating of the thrust bearing 46 on the shoulder 45 limits the downward movement of the rotor assembly, and it will be observed in this conection that the shoulder 45 forms the sole axial support for the rotor assembly, aside from the frictional resistance between the spacer member and the bearing cartridge. By this arrangement the shaft sections are free to move axially within the stators to allow for expansion and contraction due to temperature changes.

To complete the assembly of the motor, the seal assembly is inserted through the end of the housing 12, the coupling members 36 and 37 on the adjacent ends of the shaft sections 35 and 3 interengaging in driving relation and also in axial abutment to transmit any axial thrust to the thrust bearing 46. The flange 31 is bolted to the housing, sealing the end thereof except for the annular channel around the shaft, which is sealed by the mercury seal as described in the aforementioned copending application.

The motor casing 21 is then slipped upwardly over the motor, and, when the nut 23 on the lower end of bolt 17 is tightened, the gaskets 24 and 22 are compressed to seal the bolt opening and the juncture of the shell 21 and housing 12.

The many advantages of the motor described will be readily apparent. A wide selection of motors of varying capacities is made available from a small number of stock parts, requiring relatively few extra parts in addition to those required for a single-stator motor. A motor of high horsepower rating may be provided, while retaining the small diameter essential to submersible motors used for operating well pumps.

The electrical characteristics of a multiple-stator motor constructed as described are substantially the same as those of a single-stator motor, since the windings are substantially the same. By connecting the windings in series, no extra space need be provided in the upper stators for conduits leading to the lower stators, such as would be the case if the windings were connected in parallel. The connections between the stator windings are all located on the outer side of the stator assembly where they are readily accessible when the shell 21 is removed, and they are also outside the radial limits of the rotor assembly and hence need not be disturbed during the insertion or removal of the latter.

By providing a rotor assembly which is removable as a unit through one end of the motor housing, it is unnecessary to break more than one seal in order to remove the rotor and its bearings. The seal 24 around the bolt 17, the seal 22 at the juncture of the casing 21 and the housing 12, and the seal 41 between the baffle 39 and the flange 31 need not be disturbed when once made up, only the seal 32 being broken to afford access to the mercury seal and rotor assemblies.

I claim:

1. In a submersible electric motor, a stator assembly comprising a plurality of stators mounted in axial alignment, a fluid-tight housing enclosing said stator assembly, and a rotor assembly comprising a plurality of rotors, shafting operatively connecting said rotors in axial alignment, bearing means on said shafting, said shafting, rotors, and bearing means being insertible as a unit into said housing through an end thereof into operative relation with said stators.

2. In an electric motor, a stator assembly comprising a plurality of stators and spacing means connecting said stators in spaced coaxial relation, and a rotor assembly comprising a plurality of rotors, shafting operatively connecting said rotors in spaced coaxial relation, bearing means on said shafting between rotors, said rotor assembly including the rotors, shafting, and bearing means being insertible as a unit into said stator assembly through an end thereof to position each rotor within a stator and said bearing means within said spacing means.

3. A motor as defined in claim 2, including a surface on said spacing means supporting said bearing means against lateral displacement.

4. In an electric motor, a stator assembly comprising a plurality of stators mounted in axial alignment, and a rotor assembly comprising a plurality of rotors, shafting operatively connecting said rotors in axial alignment, and bearing means on said shafting, said rotor assembly including the rotors, shafting, and bearing means being insertible as a unit into said stator assembly to a position wherein each rotor is operatively associated with a respective stator.

5. A multiple-motor unit comprising: a stator assembly comprising a plurality of stators and spacing means connecting said stators in spaced coaxial relation, and a rotor assembly comprising a plurality of rotors, shafting operatively connecting said rotors in spaced coaxial relation, and bearing means on said shafting between said rotors, the bores of said stators being of substantially equal diameter, and said rotors being of substantially equal diameter, and said spacing means being bored to a diameter intermediate the rotor diameter and that of the stator bores.

6. A multiple-motor unit as defined in claim 5, in which said bearing means includes a bearing supporting member mounted on the shafting and engaging the bore of said spacing means.

7. A multiple-motor unit as defined in claim 5, including supporting means for said bearing means, and said rotors, shafting, bearing means, and bearing supporting means being insertible as a unit into said stator assembly to position each of said rotors within a stator and said bearing supporting means within said spacing means.

8. In an electric motor, a stator assembly comprising a plurality of stators and spacing means connecting said stators in spaced coaxial relation; a rotor assembly comprising a plurality of rotors, shafting operatively connecting said rotors in spaced coaxial relation, and bearing means on said shafting between said rotors, said rotor assembly being insertible as a unit into said stator assembly through one end thereof; the bores of said stators being of substantially equal diameter, and said rotors being of substantially equal diameter; said spacing means comprising at least one annular member between adjacent ends of a pair of stators, said member being bored concentric with the bores of the stators and with a diameter intermediate the rotor diameter and that of the stator bores.

9. An electric motor as defined in claim 8, in which said annular member is bored to different diameters, decreasing in the direction in which said rotor assembly is insertible.

10. An electric motor as defined in claim 8, in which said bearing means comprises a bearing supporting member mounted on the shafting and engaging the bore of said annular spacing member.

11. An electric motor as defined in claim 8, in which said annular spacing member is bored to different diameters, decreasing in the direction in which said rotor assembly is insertible, and in which said bearing means comprises a bearing supporting member mounted on the shafting, the outer surface of said supporting member being stepped to conform to the bores of said spacing member.

12. In an electric motor, a stator assembly comprising a plurality of stators and a plurality of annular spacer members connected one between adjacent ends of each pair of stators; a rotor assembly comprising a plurality of rotor shafts, rotors on said shafts, bearings on said shafts adjacent the ends thereof, coupling means connecting adjacent ends of said shafts in driving relation, and a plurality of bearing supporting members mounted on said shafts one between each pair of rotors, said rotor assembly being insertible as a unit into said stator assembly; the bores of said stators being of substantially equal diameter, said rotors being of substantially equal diameter, and said spacer members being bored to diameters intermediate the rotor diameter and that of the stator bores, the diameters of the bores of successive spacer members decreasing in the direction of insertion of said rotor assembly, and the outer surfaces of successive bearing supporting members conforming respectively to the bores of successive spacer members.

13. In an electric motor, a stator assembly comprising a plurality of stators mounted in axial alignment, and a rotor assembly comprising a plurality of rotors, shafting operatively connecting said rotors in axial alignment, radial bearing means on said shafting between said rotors, and an axial-thrust bearing adjacent one end of said shafting, said end being adapted to be connected to a driven element; a seat for said thrust bearing adjacent one end of said stator assembly; said rotor assembly including the rotors, shafting, radial bearing means, and thrust bearing being insertible as a unit into said stator assembly through the end thereof adjacent said thrust bearing seat, said seat constituting the sole axial support of said rotor assembly.

14. In a rotor assembly for a multiple-motor unit, a plurality of rotor shafts, rotors on said shafts, a bearing adjacent each end of each shaft and fixed against axial movement relative thereto, coupling means connecting adjacent ends of said shafts, and a bearing supporting member surrounding each pair of adjacent ends of said shafts, said supporting member engaging and holding said bearings in fixed axially spaced relation to each other.

VAINO A. HOOVER.